United States Patent
Huang et al.

(10) Patent No.: US 10,896,488 B2
(45) Date of Patent: Jan. 19, 2021

(54) ELECTRONIC DEVICE AND METHOD FOR REMOVING HAZE FROM IMAGE

(71) Applicant: Chiun Mai Communication Systems, Inc., New Taipei (TW)

(72) Inventors: Chun-Hsiang Huang, New Taipei (TW); Ting-Hao Chung, New Taipei (TW); Chun-Yi Wang, New Taipei (TW); Yu-Feng Kuo, New Taipei (TW)

(73) Assignee: Mobile Drive Technology Co., Ltd., New Taipei (TW)

( * ) Notice: Subject to any disclaimer, the term of this patent is extended or adjusted under 35 U.S.C. 154(b) by 75 days.

(21) Appl. No.: 16/282,605

(22) Filed: Feb. 22, 2019

(65) Prior Publication Data
US 2019/0266708 A1     Aug. 29, 2019

Related U.S. Application Data

(60) Provisional application No. 62/634,790, filed on Feb. 23, 2018.

(51) Int. Cl.
G06K 9/00     (2006.01)
G06T 5/00     (2006.01)
G06F 9/30     (2018.01)
G06T 7/12     (2017.01)

(52) U.S. Cl.
CPC .......... G06T 5/002 (2013.01); G06F 9/30003 (2013.01); G06T 5/003 (2013.01); G06T 7/12 (2017.01)

(58) Field of Classification Search
None
See application file for complete search history.

(56) References Cited

U.S. PATENT DOCUMENTS

| 2011/0188775 | A1* | 8/2011 | Sun .......................... G06K 9/40 382/274 |
| 2016/0048742 | A1* | 2/2016 | Huang ...................... G06T 5/00 382/159 |
| 2017/0091912 | A1* | 3/2017 | Nakamae .................. G06T 7/11 |
| 2017/0144585 | A1* | 5/2017 | Ogawa .................. G06K 9/6215 |

FOREIGN PATENT DOCUMENTS

| CN | 103985091 A | 8/2014 |
| CN | 106408520 A | 2/2017 |

* cited by examiner

Primary Examiner — Hadi Akhavannik
(74) Attorney, Agent, or Firm — ScienBiziP, P.C.

(57) ABSTRACT

A method for removing haze from an image is provided. The image is converted to S(x) and V(x), the S(X) is saturation component of the image, and the V(x) is value component of the image. The S(x) is filtered to obtain S'(x), and the V(x) is filtered to obtain V'(x). A depth d(x) is estimated by calculating a difference between the S'(x) and V'(x). Once a transmission map t(x) is calculated based on the d(x), haze is removed from the image based on the transmission map t(x).

15 Claims, 4 Drawing Sheets

ELECTRONIC DEVICE AND METHOD FOR REMOVING HAZE FROM IMAGE

CROSS-REFERENCE TO RELATED APPLICATIONS

This application claims priority to U.S. Provisional Application No. 62/634,790 filed on Feb. 23, 2018, the contents of which are incorporated by reference herein.

FIELD

The subject matter herein generally relates to image processing technology, and particularly to an electronic device and a method for removing haze from an image.

BACKGROUND

Pictures taken in a smoky or foggy environment may have haze obscuring details of the picture. Therefore, there is a need to provide a method for removing the haze from a picture.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
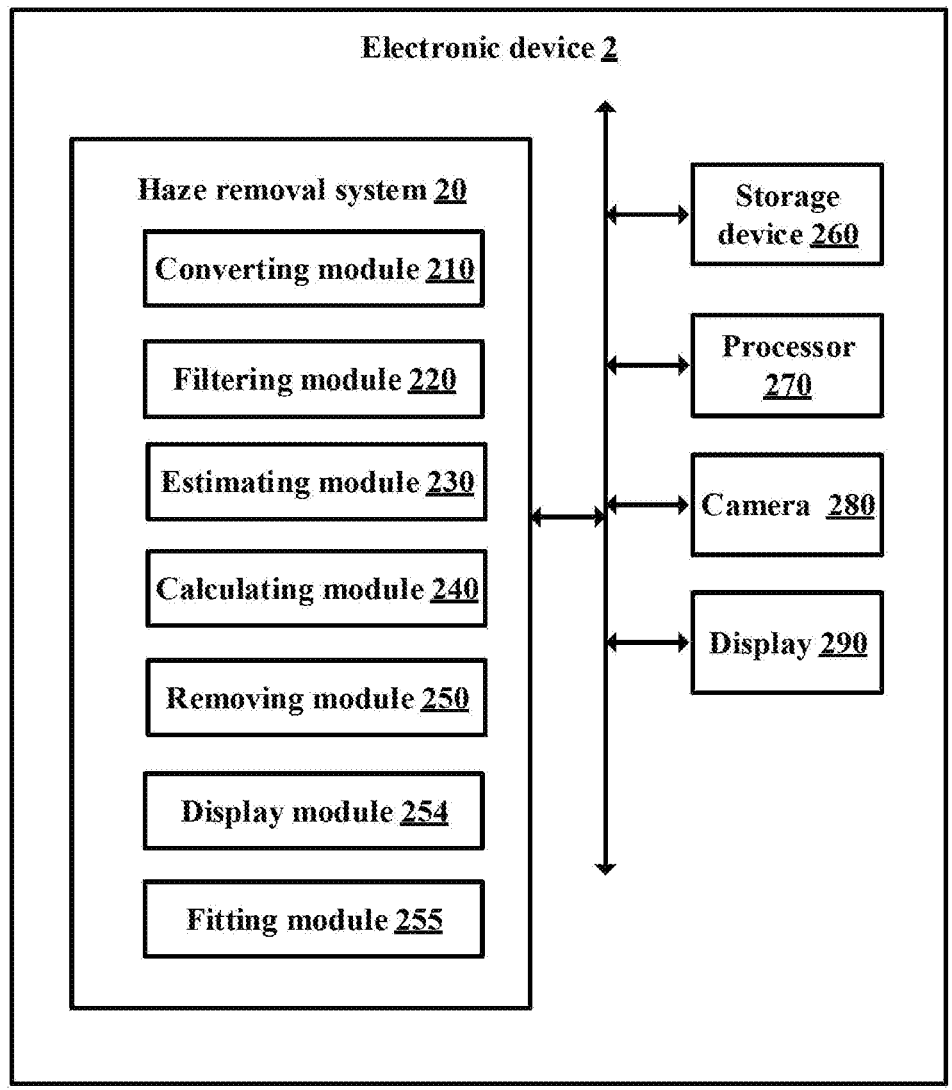
FIG. 1 is a block diagram of an embodiment of an electronic device including a haze removal system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates an exemplary embodiment of a haze removal system 20. Depending on the exemplary embodiment, the haze removal system 20 is applied to an electronic device 2. In at least one exemplary embodiment, the electronic device 2 can further include, but is not limited to, a storage device 260, at least one processor 270, a camera 280, and a display 290.

FIG. 1 illustrates only one example of the electronic device 2, other examples can comprise more or fewer components that those shown in the embodiment, or have a different configuration of the various components. The electronic device 2 can be, but is not limited to, a mobile phone, a tablet computer, a personal digital assistant (PDA), a personal computer, or any other suitable electronic devices.

In at least one exemplary embodiment, the storage device 260 can be an internal storage device, such as a flash memory, a random access memory (RAM) for temporary storage of parameters, and/or a read-only memory (ROM) for permanent storage of parameters. The storage device 260 can also be an external storage device, such as an external hard disk, a storage card, or a data storage medium. The at least one processor 270 can be a central processing unit (CPU), a microprocessor, or other data processor chip that performs functions of the electronic device 2.

In at least one exemplary embodiment, the camera 280 can be a front camera or a rear camera of the electronic device 2.

In at least one exemplary embodiment, the display 290 can be used to display data of the electronic device 2. For example, the display 290 can display a preview of an image taken by the camera 280. The display 290 can be a liquid crystal display, or an organic light-emitting diode display.

In at least one exemplary embodiment, the haze removal system 20 can include, but is not limited to, a converting module 210, a filtering module 220, an estimating module 230, a calculating module 240, a removing module 250, a display module 254, and a fitting module 255. The modules 210-255 can comprise computerized instructions in the form of one or more computer-readable programs that can be stored in a non-transitory computer-readable medium, for example in the storage device 260, and executed by the processor 270 of the electronic device 2. A detailed description of the functions of the modules 210-255 is given with reference to FIG. 2, FIG. 3, and FIG. 4.

Figure 2:
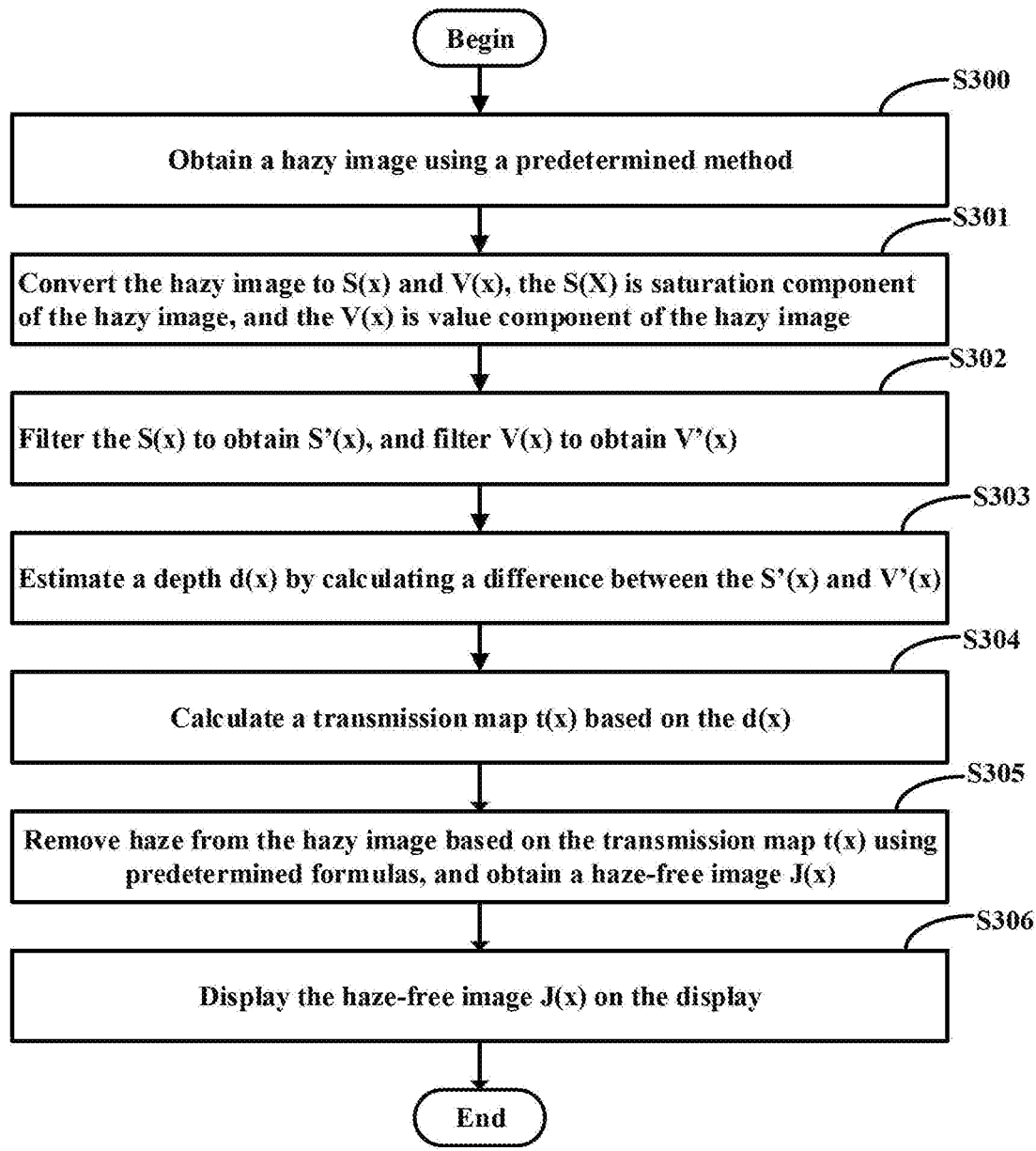
FIG. 2 is a first flowchart of an embodiment of a method for removing haze from an image.

FIG. 2 illustrates a flowchart of a first method for removing haze from an image. In an example embodiment, the method is performed by execution of computer-readable software program codes or instructions by the at least one processor 270 of the electronic device 2.

Referring to FIG. 2, the method is provided by way of example, as there are a variety of ways to carry out the method. The method described below can be carried out using the configurations illustrated in FIG. 1, for example, and various elements of these figures are referenced in explaining method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S300.

At block S300, the converting module 210 can obtain an image (hereinafter referred to as "hazy image") using a predetermined method.

In at least one exemplary embodiment, the converting module 210 can control the camera 280 to capture a view of a current scene. In at least one exemplary embodiment, the current scene may be in an environment with smoke or fog, then the image captured by camera 280 is a hazy image.

In other exemplary embodiments, the converting module 210 can obtain the hazy image from the Internet, i.e., the hazy image is downloaded from the Internet.

At block S301, the converting module 210 can convert the hazy image to S(x) and V(x). The S(x) is a saturation component of the hazy image. The V(x) is a value component of the hazy image.

In at least one exemplary embodiment, the converting module 210 can further convert the hazy image to H(x), the H(x) is a hue component of the hazy image.

At block S302, the filtering module 220 can filter the S(x) to obtain S'(x), and can filter the V(x) to obtain V'(x).

In at least one exemplary embodiment, the filtering module 220 can perform an edge-preserving smoothing process on V(x) to obtain V'(x), and can perform the edge-preserving smoothing process on S(x) to obtain S'(x). In other words, the S'(x) is a filtered version of the saturation component, and the V'(x) is filtered version of the value component.

At block S303, the estimating module 230 can estimate a depth d(x) by calculating a difference between the S'(x) and V'(x).

In at least one exemplary embodiment, the depth d(x) equals an absolute value of the difference between the S'(x) and V'(x).

At block S304, the calculating module 240 can calculate a transmission map t(x) based on the d(x).

In at least one exemplary embodiment, the transmission map t(x) is calculated according to $t(x)=e^{-\beta*d(x)}$.

In a first exemplary embodiment, "β" is determined according to a weather information of a position where the hazy image is captured. In at least one exemplary embodiment, "β" equals a first value when the weather is sunny, and "β" equals a second value when the weather is not sunny. In at least one exemplary embodiment, the first value can be 1, and the second value is greater than 0, but less than 1. For example, the second value can be 0.5, or 0.6.

In a second exemplary embodiment, "β" is determined according to a concentration of PM (particulate matter) of the position where the hazy image is captured. In at least one exemplary embodiment, "β" equals the first value when the concentration of PM (such as PM 2.5) is greater than a preset value. "β" equals the second value when the concentration of PM is less than or equal to the preset value. In at least one exemplary, the preset value can be 45, 50, or other value.

In at least one exemplary embodiment, the calculating module 240 can obtain the weather and the concentration of PM from the Internet or by accessing a predetermined application such as a weather application.

At block S305, the removing module 250 can remove haze from the hazy image based on the transmission map t(x) according to following formulas, and obtain a haze-free image J(x).

The formulas include:

$$I(x)=J(x)*t(x)+(1-t(x))*A$$

$$J(x)=[I(x)-(1-t(x))*A]/t(x)$$

In at least one exemplary embodiment, "A" represents an atmospheric light value of the hazy image. In at least one exemplary embodiment, a gray value of a brightest point in the hazy image can be set as the atmospheric light value.

As mentioned above, "t(x)" is obtained at block S304. In at least one exemplary embodiment, "I(x)" represents an intensity of light in the hazy image.

At block S306, the display module 254 can further display the haze-free image J(x) on the display 290.

Figure 3:
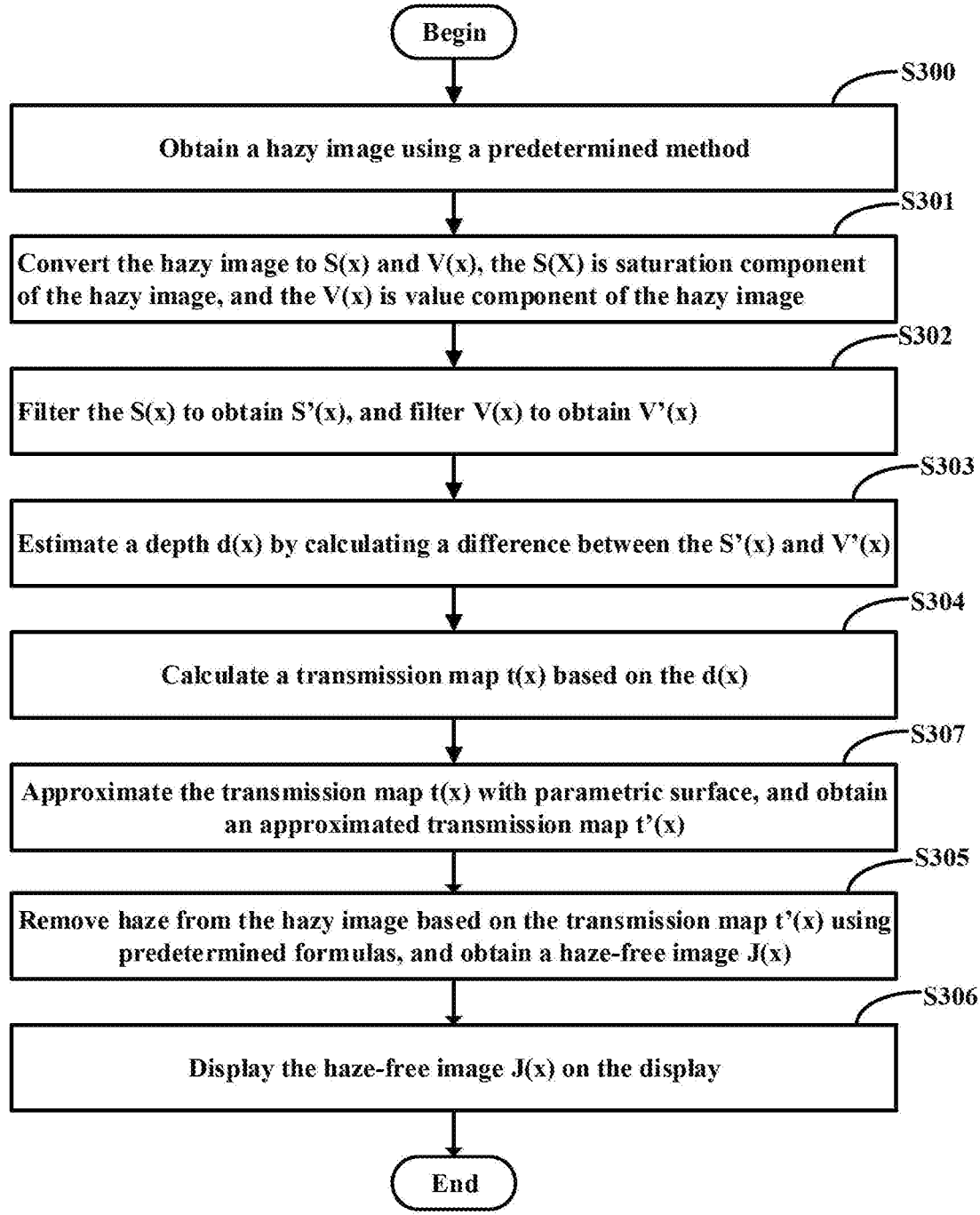
FIG. 3 is a second flowchart of an embodiment of a method for removing haze from an image.

Referring to FIG. 3, a flowchart of second method in accordance with another example embodiment is presented. The blocks S300-S306 of method in FIG. 3 are the same as those in FIG. 2. In this embodiment, a block S307 is further performed between block S304 and block S305.

At block S307, the fitting module 255 can approximate the transmission map t(x) with parametric surface, and obtain an approximated transmission map t'(x). The fitting module 255 then transmits the approximated transmission map t'(x) to the removing module 250 for haze removal process at block S305. In the I(x) and J(x) formulas of the removal process at block S305, the t(x) is replaced by t'(x). In other words, at block S305, the removing module 250 can obtain the haze-free image J(x) by removing haze from the hazy image based on following formulas:

$$I(x)=J(x)*t'(x)+(1-t'(x))*A$$

$$J(x)=[I(x)-(1-t'(x))*A]/t'(x).$$

Figure 4:
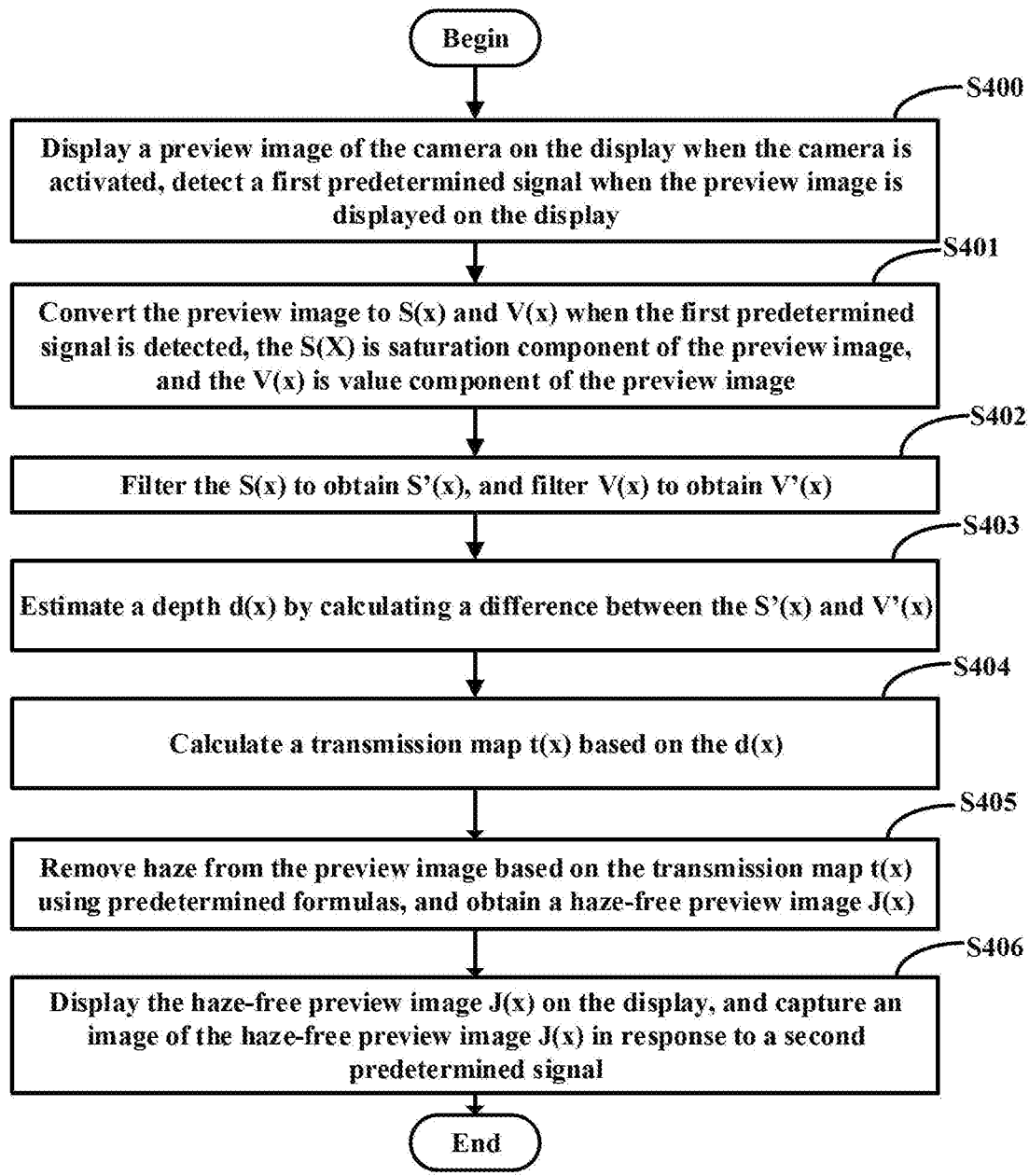
FIG. 4 is a third flowchart of an embodiment of a method for removing haze from an image.

FIG. 4 illustrates a flowchart of a third method for removing haze from an image. In the example embodiment, the method is performed by execution of computer-readable software program codes or instructions by at least one processor of the electronic device.

Referring to FIG. 4, the method is provided by way of example, as there are a variety of ways to carry out the method. The method described below can be carried out using the configurations illustrated in FIG. 1, for example, and various elements of these figures are referenced in explaining method. Each block shown in FIG. 4 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S400.

At block S400, the display module 254 can display a preview image of the camera 280 on the display 290 when the camera 280 is activated. The display module 254 can further detect a first predetermined signal when the preview image is displayed on the display 290.

In at least one embodiment, the display module 254 can display a predetermined button on the preview image, and the first predetermined signal can be a signal generated when the predetermined button is pressed.

At block S401, when the first predetermined signal is detected, the converting module 210 can convert the preview image to S(x) and V(x). The S(x) is a saturation component of the preview image. The V(x) is a value component of the preview image.

In at least one exemplary embodiment, the converting module 210 can further convert the preview image to H(x), the H(x) is a hue component of the preview image.

At block S402, the filtering module 220 can filter the S(x) to obtain S'(x), and can filter V(x) to obtain V'(x).

In at least one exemplary embodiment, the filtering module 220 can perform an edge-preserving smoothing process on V(x) to obtain V'(x), and can perform the edge-preserving smoothing process on S(x) to obtain S'(x). In other words, the S'(x) is a filtered version of the saturation components, and the V'(x) is filtered version of the value components.

At block S403, the estimating module 230 can estimate a depth d(x) by calculating a difference between the S'(x) and V'(x).

At block S404, the calculating module 240 can calculate a transmission map t(x) based on the d(x).

In at least one exemplary embodiment, the transmission map t(x) is calculated according to $t(x)=e^{-\beta*d(x)}$.

In a first exemplary embodiment, "β" is determined according to a weather information of a current position where the electronic device 2 is located. In at least one exemplary embodiment, "β" equals a first value when the weather is sunny, and "β" equals a second value when the weather is not sunny. In at least one exemplary embodiment, the first value can be 1, and the second value is greater than 0, but less than 1. For example, the second value can be 0.5, or 0.6.

In a second exemplary embodiment, "β" is determined according to a concentration of PM (particulate matter) of the current position where the electronic device 2 is located. In at least one exemplary embodiment, "β" equals the first value when the concentration of PM (such as PM 2.5) is greater than a preset value. "β" equals the second value when the concentration of PM is less than or equal to the preset value. In at least one exemplary, the preset value can be 45, 50, or another value.

In at least one embodiment, the calculating module 240 can obtain the weather and the concentration of PM from the Internet or by accessing a predetermined application such as a weather application.

At block S405, the removing module 250 can remove haze from the preview image based on the transmission map t(x) according to following formulas, and obtain a haze-free preview image J(x).

The formulas include:

$$I(x)=J(x)*t(x)+(1-t(x))*A$$

$$J(x)=[I(x)-(1-t(x))*A]/t(x)$$

In at least one exemplary embodiment, "A" represents an atmospheric light value of the preview image. In at least one exemplary embodiment, a gray value of a brightest point in the preview image can be set as the atmospheric light value.

As mentioned above, "t(x)" is obtained at block S404. In at least one exemplary embodiment, "I(x)" represents an intensity of the preview image.

At block S406, the display module 254 can further display the haze-free preview image J(x) on the display 290, and capture an image of the haze-free preview image J(x) in response to a second predetermined signal.

In at least one exemplary embodiment, the second predetermined signal can be a signal that is generated when a home button of the electronic device 2 is pressed. In other exemplary embodiments, the second predetermined signal can be a signal that is generated when one or more physical buttons of the electronic device 2 are pressed at the same time.

In other exemplary embodiments, the display module 254 can automatically capture the image of the haze-free preview image J(x) when the removing module 250 obtains the haze-free preview image J(x).

It should be noted that, in other exemplary embodiments, after block S404 is processed, the fitting module 255 can approximate the transmission map t(x) with parametric surface, and obtain an approximated transmission map t'(x). The fitting module 255 then transmits the approximated transmission map t'(x) to the removing module 250 for haze removal process at block S405. In the I(x) and J(x) formulas of the removal process at block S405, the t(x) is replaced by t'(x). In other words, at block S405, the removing module 250 can obtain the haze-free preview image J(x) by removing haze from the preview image based on following formulas:

$$I(x)=J(x)*t'(x)+(1-t'(x))*A$$

$$J(x)=[I(x)-(1-t'(x))*A]/t'(x).$$

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for removing hazy from an image applied to an electronic device, the method comprising:
converting the image to S(x) and V(x), wherein the S(x) is a saturation component of the image, and the V(x) is a value component of the image;
filtering the S(x) to obtain S'(x), and filtering V(x) to obtain V' (x);
estimating a depth d(x) by calculating a difference between the S'(x) and V'(x);
calculating a transmission map t(x) based on the d(x); and
removing haze from the image based on the transmission map t(x) and obtaining a haze-free image J(x).

2. The method according to claim 1, further comprising:
performing an edge-preserving smoothing process on V(x) to obtain V'(x), and performing the edge-preserving smoothing process on S(x) to obtain S'(x).

3. The method according to claim 1, wherein the transmission map $t(x)=e^{-\beta*d(x)}$, wherein "β" is determined according to a weather information or a concentration of particulate matter of a current position where the image is captured.

4. The method according to claim 3, wherein the haze is removed from the image based on the transmission map t(x) according to following formulas:

$$I(x)=J(x)*t(x)+(1-t(x))*A;$$

$$J(x)=[I(x)-(1-t(x))*A]/t(x);$$

wherein "A" represents an atmospheric light value of the image, "I(x)" represents an intensity of the image, and "J(x)" represents the haze-free image.

5. The method according to claim 1, wherein the image is a preview image of a camera of the electronic device.

6. An electronic device comprising:
a storage device;
at least one processor; and
the storage device storing one or more programs, which when executed by the at least one processor, cause the at least one processor to:
convert the image to S(x) and V(x), wherein the S(x) is a saturation component of the image, and the V(x) is a value component of the image;
filter the S(x) to obtain S'(x), and filter V(x) to obtain V'(x);
estimate a depth d(x) by calculating a difference between the S'(x) and V'(x);
calculate a transmission map t(x) based on the d(x); and
remove haze from the image based on the transmission map t(x) and obtain a haze-free image J(x).

7. The electronic device according to claim 6, wherein the at least one processor is further caused to:
perform an edge-preserving smoothing process on V(x) to obtain V'(x), and perform the edge-preserving smoothing process on S(x) to obtain S'(x).

8. The electronic device method according to claim 6, wherein the transmission map $t(x)=e^{-\beta *d(x)}$, wherein "β" is determined according to a weather information or a concentration of particulate matter of a current position where the image is captured.

9. The recognizing method according to claim 8, wherein the haze is removed from the image based on the transmission map t(x) according to following formulas:

$$I(x)=J(x)*t(x)+(1-t(x))*A;$$

$$J(x)=[I(x)-(1-t(x))*A]/t(x);$$

wherein "A" represents an atmospheric light value of the image, "I(x)" represents an intensity of the image, and "J(x)" represents the haze-free image.

10. The recognizing method according to claim 6, wherein the image is a preview image of a camera of the electronic device.

11. A non-transitory storage medium having instructions stored thereon, when the instructions are executed by a processor of an electronic device, the processor is configured to perform a method of removing haze from an image, wherein the method comprises:
converting the image to S(x) and V(x), wherein the S(x) is a saturation component of the image, and the V(x) is a value component of the image;
filtering the S(x) to obtain S'(x), and filtering V(x) to obtain V'(x);
estimating a depth d(x) by calculating a difference between the S'(x) and V'(x);
calculating a transmission map t(x) based on the d(x); and
removing haze from the image based on the transmission map t(x) and obtaining a haze-free image J(x).

12. The non-transitory storage medium according to claim 11, wherein the method further comprises:
performing an edge-preserving smoothing process on V(x) to obtain V'(x), and performing the edge-preserving smoothing process on S(x) to obtain S'(x).

13. The non-transitory storage medium according to claim 11, wherein the transmission map $t(x)=e^{-\beta *d(x)}$, wherein "β" is determined according to a weather information or a concentration of particulate matter of a current position where the image is captured.

14. The non-transitory storage medium according to claim 13, wherein the haze is removed from the image based on the transmission map t(x) according to following formulas:

$$I(x)=J(x)*t(x)+(1-t(x))*A;$$

$$J(x)=[I(x)-(1-t(x))*A]/t(x);$$

wherein "A" represents an atmospheric light value of the image, "I(x)" represents an intensity of the image, and "J(x)" represents the haze-free image.

15. The non-transitory storage medium according to claim 11, wherein the image is a preview image of a camera of the electronic device.

* * * * *